Nov. 8, 1932.  J. FRIZNER  1,887,087
LICENSE PLATE HOLDER AND SIGNAL LIGHT
Filed Dec. 29, 1931
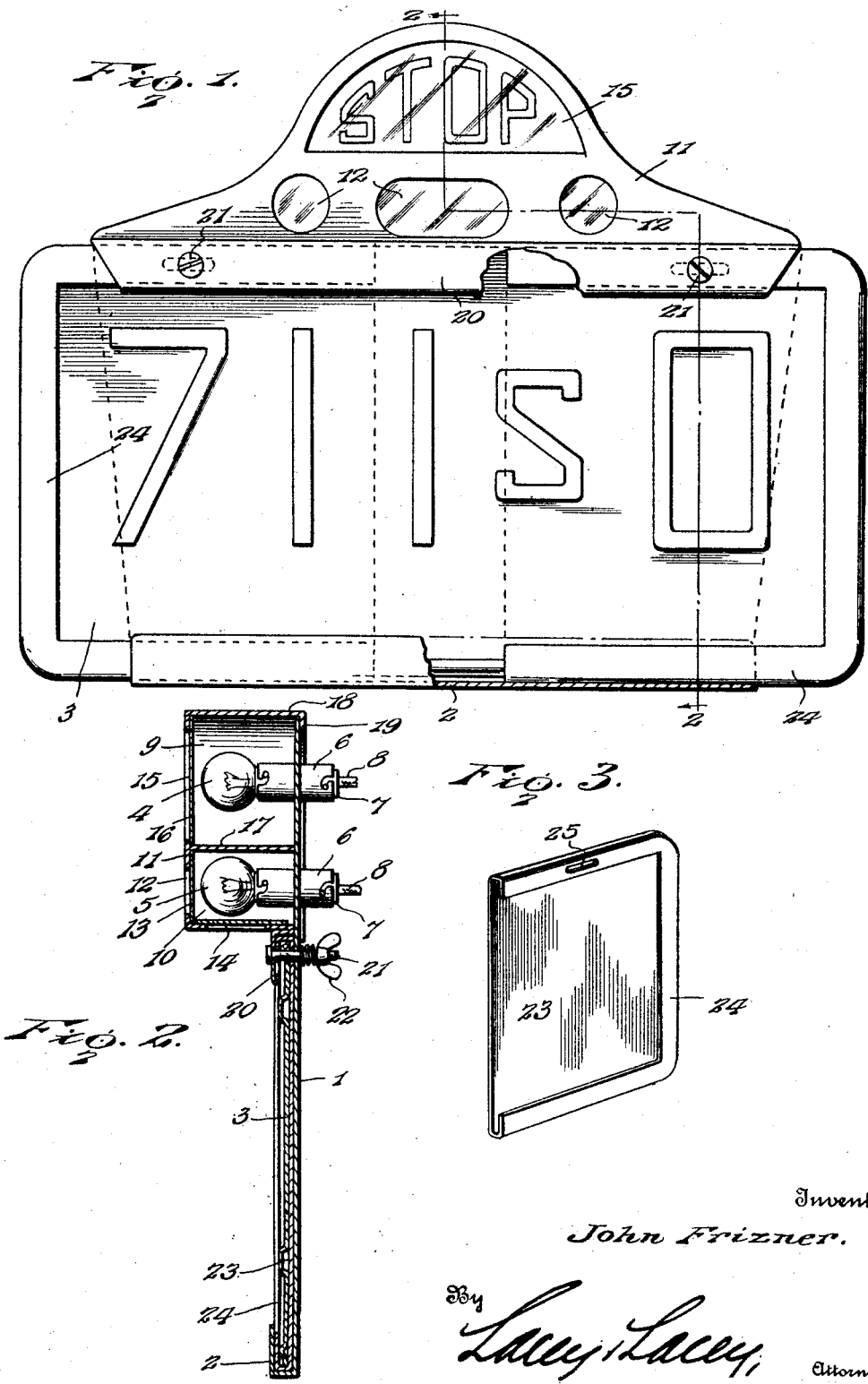
Inventor
John Frizner.
By Lacey & Lacey,
Attorneys Patented Nov. 8, 1932

1,887,087

UNITED STATES PATENT OFFICE

JOHN FRIZNER, OF DENVILLE, NEW JERSEY

LICENSE PLATE HOLDER AND SIGNAL LIGHT

Application filed December 29, 1931. Serial No. 583,751.

This invention provides a simple, light and inexpensive device for holding an automobile license plate and the lights for illuminating the plate and for giving a stop signal, a particular object of the present invention being the provision of means whereby the entire edge of the license plate will be reinforced and protected and may be placed in the holder through either end thereof. The invention is illustrated in the accompanying drawing and consists in certain novel features which will be particularly pointed out in the claim following a detailed description.

In the drawing, Fig. 1 is an elevation of a device embodying the invention,

Fig. 2 is a transverse section on the line 2—2 of Fig. 1,

Fig. 3 is a detail perspective view of an end frame.

In carrying out the invention, there is provided a back plate 1 having downwardly converging side edges and provided along its lower or narrow end with a flange 2, formed by doubling the back plate upon itself whereby a groove is formed to receive the lower edge of the license plate 3. The back plate is extended upwardly beyond the greatest height of standard license plates and is suitably shaped to accommodate and carry the signal and tail lamps, indicated at 4 and 5, tubular holders 6 being formed or secured on the back plate to receive the lamps and socket members 7 carrying cords 8 through which current may be fed to the lamps to energize the same. The lamps will be controlled in the manner now generally practiced, the tail lamp 5 being controlled by a switch accessible to the chauffer and the stop signal lamp 4 being controlled by the operation of the brakes in a well-known manner.

Cooperating with the upper portion of the back plate is a frame structure of such form as to provide a box or chamber 9 receiving the stop signal lamp 4 and a lower box or chamber 10 receiving the tail light 5. This frame has a front plate 11 having openings 12 in its lower portion which are preferably disposed as shown in Fig. 1, and include a central elongated opening and smaller circular openings spaced from the ends of the central opening. These openings are glazed, as indicated at 13, and the glazing material is preferably colored so as to attract attention and be easily seen. The bottom of the lower box 10 is provided with an opening 14 therethrough which extends from end to end of the box and is likewise glazed, the glazing material being clear as this opening is provided to permit illumination of the license plate. A large opening 15 is formed through the upper portion of the front plate 11 and this opening is also glazed, the glazing material being colored red and preferably displaying the word "stop", as shown in Fig. 1. The frame 11 is provided with a partition 17 extending from end to end thereof and serving to separate the upper and lower boxes 9 and 10. The frame is closed at its ends and also has a cover member 18 which is suitably shaped to conform to the outline of the upper edge of the back plate, and along the rear edge of the cover or roof is a depending flange or rim 19 which fits closely against the rear side of the back plate 1, as shown clearly in Fig. 2. The frame is so proportioned that its bottom will extend over the upper edge of the license plate, as shown in Fig. 2, and thereby prevent the plate rising from its seat in the holder. Spaced from the rear edge of the bottom of the frame and from the back plate sufficiently to accommodate the license plate and reinforcements thereon is a depending rib or flange 20 having its opposite ends inclined downwardly and its intermediate portion provided with openings so located as to aline with openings through the back plate and through the upper margin of the license plate, bolts 21 being fitted through the openings and nuts 22 being mounted on the bolts to be turned home against the back plate to firmly secure the back plate, the upper frame and the license plate together, and these same bolts are used to secure the holder upon the automobile. In the present instance, as shown in Fig. 2, the flange 20 is produced by bending the metal of the bottom forwardly and then downwardly.

The length of the back plate is less than the length of the license plate and upon each end of the latter is fitted an end frame or pocket consisting of a plate 23 having a reentrant flange 24 on its front face along three of its edges. An opening 25 is formed through the upper margin and flange to receive the fastening bolt 22. The end frame will closely fit around the end portion of the license plate and the license plate, thus jacketed, may be readily slid endwise into the grooved flange 2 and behind the rib or flange 20. Changing the license plate thus becomes a very simple matter while the plate is very effectually reinforced and guarded against bending.

Ordinarily, there will be no necessity for separating the upper box-forming frame from the back plate, but if it should be necessary to renew the lamps or bulbs, the bolts 21 are loosened and withdrawn, and the box is then lifted upwardly from the back plate until the flange 19 clears the upper edge thereof whereupon the lamp sockets will be accessible and new lamps may be easily fitted therein.

Having thus described the invention, I claim,

A device of the class described comprising a back plate having its side edges converging downwardly and its lower end provided with a terminal horizontal guide flange, an upper guide flange spaced vertically from the lower flange and provided with openings, coacting substantially rectangular end frames slidably mounted in said guide flanges and adapted to receive a license plate, the combined length of the end frames being greater than the width of the back plate and said end frames being each provided with a marginal flange on three sides thereof to receive the license plate, one of the flanges of each end frame at the top thereof being provided with a horizontal slot, clamping bolts extending through the openings in the upper guide flange, and horizontal slots in the flanges of the end frames and through alined openings in the license plate and back plate, nuts engaging the inner ends of the clamping bolts and springs interposed between the nuts and said back plate for holding the end frames carrying the license plate in adjusted position with respect to said back plate.

In testimony whereof I affix my signature.

JOHN FRIZNER.